US012716180B2

(12) United States Patent
Marsolek et al.

(10) Patent No.: US 12,716,180 B2
(45) Date of Patent: Aug. 25, 2026

(54) COMPACTOR PATH PLANNING BASED ON EDGE TYPE

(71) Applicant: Caterpillar Paving Products Inc., Brooklyn Park, MN (US)

(72) Inventors: John L. Marsolek, Watertown, MN (US); Nathaniel S. Doy, Maple Grove, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 455 days.

(21) Appl. No.: 18/105,061

(22) Filed: Feb. 2, 2023

(65) Prior Publication Data

US 2024/0263405 A1 Aug. 8, 2024

(51) Int. Cl.

*E01C 19/00* (2006.01)
*E01C 19/26* (2006.01)
*G05D 1/00* (2024.01)

(52) U.S. Cl.

CPC ......... *E01C 19/004* (2013.01); *G05D 1/0038* (2013.01); *E01C 19/26* (2013.01)

(58) Field of Classification Search

None
See application file for complete search history.

(56) References Cited

U.S. PATENT DOCUMENTS 6,934,615 B2 8/2005 Flann et al.
7,491,014 B2 2/2009 Sick
2015/0332114 A1* 11/2015 Springer ................ H04N 7/183 348/148
2016/0060820 A1* 3/2016 Berning ................ E01C 19/264 404/84.2
2018/0030672 A1* 2/2018 Marsolek ................ E01C 23/07
2018/0101177 A1* 4/2018 Cohen .................... G01C 21/34
2019/0180115 A1* 6/2019 Zou ...................... G06V 20/588
2021/0008997 A1* 1/2021 Marsolek ................ B60L 53/31
2021/0012520 A1* 1/2021 Zhou .................... G05D 1/0038
2021/0197852 A1 7/2021 Fairfield et al.
2021/0215542 A1* 7/2021 Tarvin ...................... G01J 5/10

(Continued)

FOREIGN PATENT DOCUMENTS

CN 205507542 U 8/2016
CN 109000660 A 12/2018

(Continued)

OTHER PUBLICATIONS

Western States CAT, "Fundamentals of Asphalt Compaction" (Year: 2017).*

(Continued)

*Primary Examiner* — Amelia Vorce

(57) ABSTRACT

A compactor can include an interface configured to receive position information of a first side edge and a second side edge opposite the first side edge of a work area of the compactor. The compactor can also include processing circuitry coupled to the interface to receive position information of a first side edge and a second side edge opposite the first side edge of a work area of the compactor. The processing circuitry can generate a path plan for the work machine based on location and classification of the first side edge and the second side edge. The processing circuitry can operate the compactor based on the path plan.

22 Claims, 4 Drawing Sheets

(56) References Cited

U.S. PATENT DOCUMENTS

| | | | | |
|---|---|---|---|---|
| 2022/0024485 | A1* | 1/2022 | Theverapperuma | G06V 20/58 |
| 2022/0349725 | A1* | 11/2022 | Chreptyk | G01C 21/32 |
| 2022/0390608 | A1* | 12/2022 | Park | G01S 17/931 |
| 2023/0020213 | A1* | 1/2023 | Commuri | E01C 19/288 |
| 2023/0042867 | A1* | 2/2023 | Degnan | A01D 34/863 |
| 2023/0413711 | A1* | 12/2023 | Kreykes | A01B 79/005 |
| 2024/0135728 | A1* | 4/2024 | Ferencz | G01C 21/3804 |
| 2024/0150975 | A1* | 5/2024 | Horn | E01C 19/006 |

FOREIGN PATENT DOCUMENTS

| | | | | |
|---|---|---|---|---|
| CN | 113525421 | A | 10/2021 | |
| EP | 3524731 | A1 * | 8/2019 | E01C 19/004 |
| WO | 2021106389 | A1 | 6/2021 | |

OTHER PUBLICATIONS

“CAT Paving Products, Guide to Asphalt Compaction”, Caterpillar, Inc., https: www.cat.com en_US articles support paving-application-guides.html, (2012), 152 pgs.

* cited by examiner

COMPACTOR PATH PLANNING BASED ON EDGE TYPE

TECHNICAL FIELD

This disclosure relates to road construction equipment, and more specifically to a system and method for planning compaction paths of compactor equipment.

BACKGROUND

Work machines can be controlled to implement predetermined work plans in a work area. Some work machines such as compactors may work in road areas that may or may not include confinement structures (such as curbs) at the road edges, or centerline features. Automated control of these work machines should consider confinement structures and other features when generating work plans.

Chinese patent application 113525421A discusses a path planning system for an automatic driving road roller that acquires positions of side edges of a road and determines linear paths to be pressed according to the width of the roller.

SUMMARY OF THE INVENTION

In an example according to the present disclosure, a compactor can include an interface configured to receive position information of a first side edge and a second side edge opposite the first side edge of a work area of the compactor. The compactor can further include processing circuitry to receive position information of a first side edge and a second side edge opposite the first side edge of a work area of the compactor. The processing circuitry can generate a path plan for the compactor based on location and classification of the first side edge and the second side edge. The processing circuitry can operate the compactor based on the path plan.

In another example according to this disclosure, a method for operating a compactor can include receiving position information of a first side edge and a second side edge opposite the first side edge of a work area of the compactor. The method can include classifying each of the first side edge and the second side edge as either a confined edge or an un-confined edge. The method can include generating a path plan for the compactor based on location and classification of the first side edge and the second side edge. The method can include operating the compactor based on the path plan.

In another example, according to the disclosure, a system can include an image capturing device configured to capture an image of at least a portion of an environment adjacent to a compactor. The system can include a location sensor configured to detect location of the compactor. The system can include processing circuitry to receive position information of a first side edge and a second side edge opposite the first side edge of a work area of the compactor. The processing circuitry can generate a path plan for the compactor based on location and classification of the first side edge and the second side edge.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
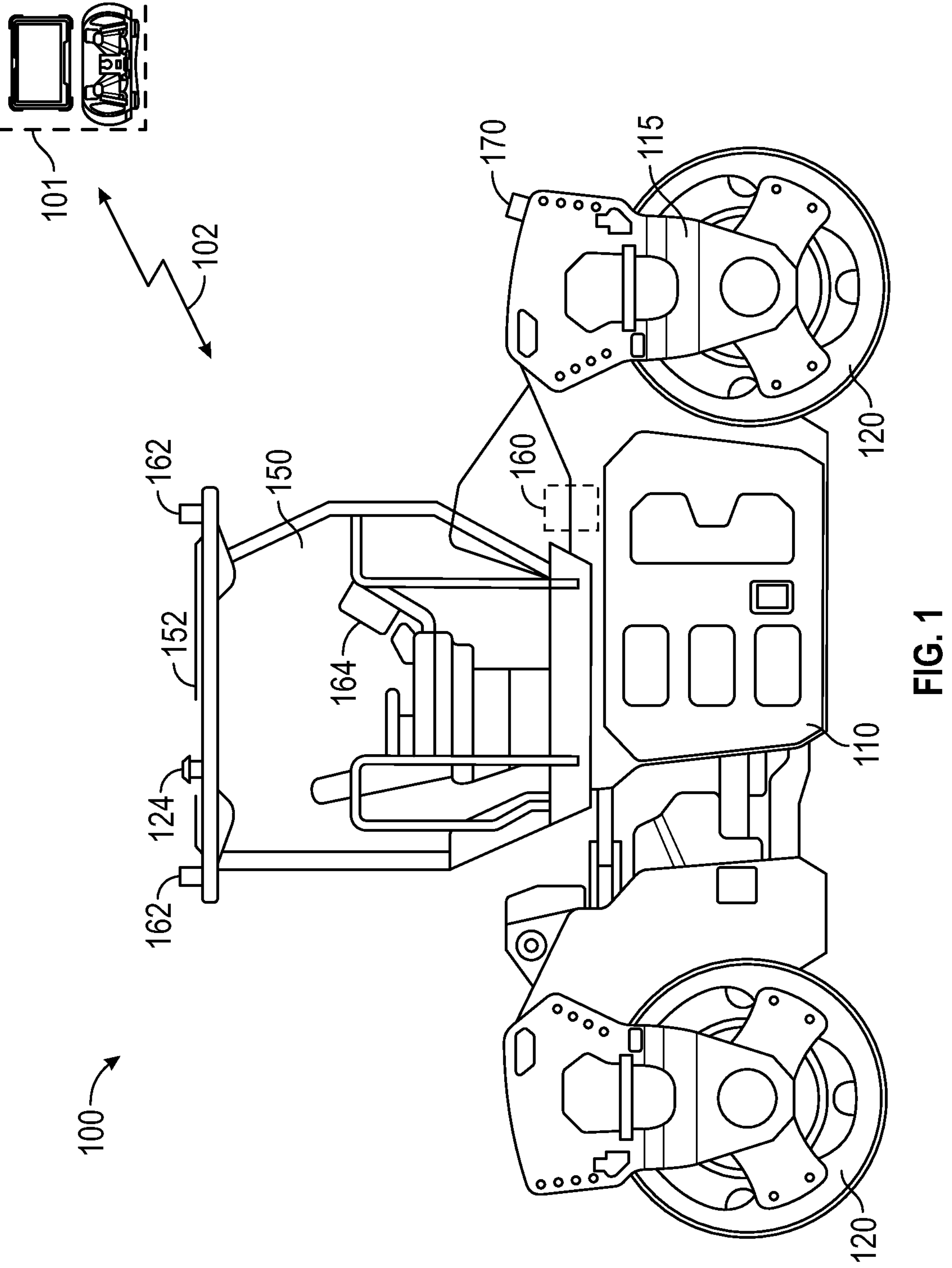
FIG. 1 shows a side view of an asphalt compactor machine, in accordance with this disclosure.

FIG. 1 shows a side view of a compactor work machine 100, in accordance with this disclosure. While example embodiments are described with reference to a compactor work machine 100, examples according to this disclosure are applicable to a variety of types of work machines, including graders, scrapers, dozers, and excavators, as examples.

The work machine 100 generally includes a body or machine frame 110 that connects and associates the various physical and structural features that enable the work machine 100 to function. These features can include an operator's cab 150 that is mounted on top of the machine frame 110 from which an operator may control and direct operation of the work machine 100. Accordingly, a steering feature and similar controls may be located within the operator's cab 150. To propel the work machine 100 over a surface, a power system such as an internal combustion engine can also be mounted to the machine frame 110 and can generate power that is converted to physically move the machine.

Work machine 100 can include at least a cylindrical roller drum 120 which is rotatable about a drum axis oriented generally transverse to a direction of travel of the work machine 100. The roller drum 120 is attached to the machine frame 110 using drum supports 115. The work machine 100 articulates such that the back section can articulate relative to the front section.

The work machine 100 may further include a location sensor 124 connected at one or more locations. The location sensor 124 may be capable of determining a location of the work machine 100 and may include and/or comprise a component of a global positioning system (GPS). For example, the location sensor 124 may comprise a GPS receiver, transmitter, transceiver or other such device, and the location sensor 124 may be in communication with one or more GPS satellites to determine a location of the work machine 100 continuously, substantially continuously, or at various time intervals.

Figure 2:
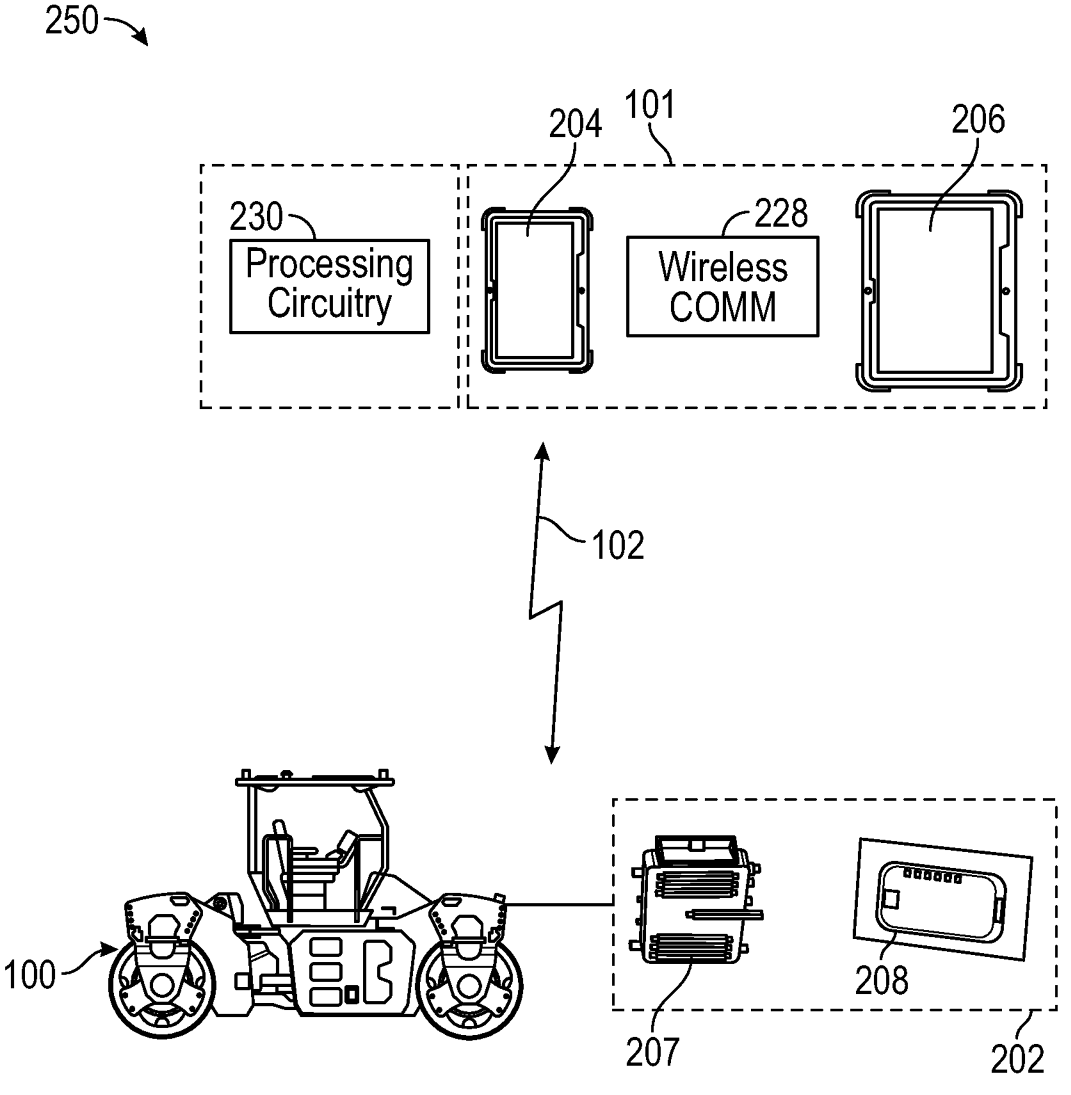
FIG. 2 is schematic diagram depicting an example remote manual and autonomous machine control system in accordance with this disclosure.

The work machine 100 can include one or more camera/s 162 mounted to the machine frame 110 so as to capture an image of at least a portion of an environment adjacent to the work machine 100. For example, camera/s 162 can be positioned above a cab roof 152. In some embodiments, a 360° view can be provided although embodiments are not limited thereto, and less than 360° view can be provided. While two cameras 162 are shown, fewer than two cameras may be used, or more than two cameras can be used. A display 164 can be provided in the operator's cab 150 showing the image data provided by the camera/s 162. The location sensor 124 and/or the camera/s 162 may include thermal imaging circuitry or systems. The work machine 100 can be wirelessly communicatively connected using connection 102 to remote control apparatus 101 and/or to a remote manual and autonomous machine control system 250 (FIG. 2).

Work machine 100 may include one or more controllers or other digital electronics configured to control various aspects of machine operation in accordance with a stored program(s) specifying one or more construction or other types of tasks. Work machine 100 can be configured to receive task instructions and to execute the task autonomously by the controller(s) processing the task instructions/program and causing various systems of work machine 100 (e.g., throttle, braking, steering, implement use and articulation, etc.) to execute the task in accordance with the instructions/program. For safety and other reasons, an operator will typically monitor work machine 100 executing such autonomous tasks, but, barring the need to intervene for some unexpected reason (e.g., avoid an object in machine path), work machine 100 is configured to complete the autonomous tasks without requiring additional input from the operator.

Work machine 100 is also configured to be manually controlled by an operator that is not on/in or at the machine. Manual remote control of work machine 100 may provide a number of benefits over and above the typical in-situ manual control of the machine and work machine 100 operating autonomously to execute predetermined tasks. For example, there are many situations where work machine 100, while operating autonomously, may need to be positioned to start a task or transported from one completed autonomous task to a starting position of a new autonomous task. In such situations, completion of one or more tasks may be substantially improved in efficiency, time, etc. by a remote operator being able to manually control work machine 100 in conjunction with or separate from autonomous tasks being executed by the machine without operator control. FIG. 2 is a schematic diagram depicting an example remote manual and autonomous machine control system 250 in accordance with this disclosure. In FIG. 2, system 250 includes work machine 100 and remote control apparatus 101. Additionally, work machine 100 includes wireless communication module 202 and remote control apparatus 101 includes a user interface 204. In available systems, cameras provide separate input to show surroundings of the work machine 100. A wireless communication module 202 of work machine 100 includes wireless transceiver 207 and wireless network adaptor 208.

The user interface 204 of remote control apparatus 101 can include one or more input devices configured to receive input from the operator related to autonomous tasks of work machine 100 and one or more output devices configured to output information related to the autonomous tasks to the operator. In some examples, and in available systems, a separate second user interface 206 is provided to display at least a portion of an environment adjacent to the work machine 100, using images provided by the cameras 162 (FIG. 1) received over connection 102. Wireless communication circuitry 228 can communicate with wireless communication module 202 of the work machine 100 (and similarly the wireless communication circuitry 229 of the remote operator station 200 can communicate with wireless communication module 202, although this is not shown in FIG. 2).

Processing circuitry 230 can be associated with the remote control apparatus 101 to receive images from the image capturing devices (e.g., cameras 162). The processing circuitry 230 is illustrated as co-located with the remote control apparatus 101 in FIG. 2, but embodiments are not limited thereto and the processing circuitry 230 can be completely or partially located remote from the remote control apparatus 101, in the cloud, or as a standalone computing system (not shown in FIG. 2).

As described above, the work machine 100 can perform compaction operations. Many factors can affect asphalt compaction operations. One factor is the rolling pattern used for compaction. A rolling pattern is a series of movements made by a compactor on an uncompacted surface. The rolling pattern should be consistently repeated to produce uniform density in the asphalt layer Rolling patterns can be programmed as part of a work plan or path plan, using controllers of the work machine 100. Additionally or alternatively, indications may be given to the operator (either at the work machine 100 or at a remote location) instructing the operator regarding which rolling movements to make.

Road surfaces on which compactors operate may include confined edges (e.g., curbs) or unconfined edges. However, many systems in use today do not account for techniques for dealing with different road edge types when developing work plans. For example, by not adjusting for adjacent cold mat or edges (e.g., curbs) compaction performed may be less than optimal, hot mat can be deployed in undesirable locations, etc.

To address these and other concerns, systems, apparatuses and methods according to some embodiments can provide automatic path planning for an asphalt compactor based on edge type. The path planning inputs can specifications for or indications of the edge type/s in the road building plan, which will allow the system of embodiments to create the necessary path plan to provide improved road quality. Based on the type of edge in the road being built (e.g., a confined edge having, for example a curb or an un-confined edge), processing circuitry 230 can generate or modify a path plan of the work machine 100 to prevent adverse effects such as hot asphalt mat being squeezed out by the work machine 100. In some embodiments, cameras or other devices (e.g., light detection and ranging (Lidar) devices) can be used by processing circuitry 230 to automatically change the path plan according to the type of road edge being built.

In systems and methods according to embodiments, the processing circuitry 230 can receive position information of a first side edge and a second side edge opposite the first side edge of a work area of the compactor, over an interface that can include any device remote or local to the work machine 100 for providing imaging, including thermal imaging, etc.

Upon receiving this position information, the processing circuitry 230 can classify the first side edge and the second side edge as either confined or unconfined. As mentioned earlier herein, a confined edge can be confined in the sense that a curb is present, the curb limiting movement of a portion of an adjacent mat as a compactor passes over that portion. The curb can be comprised of various materials and be of various heights, with at least the height and location detectable using imaging or other procedures described herein.

Classification can be performed based on manual user input, with the manual user input being provided in response to a request displayed on, for example, a user display. However, embodiments are not limited to manual user classification of edge types. In addition to manual classification, the processing circuitry 230 can implement image processing algorithms or image recognition to recognize presence of curb structures. In some embodiments, the processing circuitry 230 can specify a lateral distance from the work machine 100 for edge detection scanning. In addition, the processing circuitry 230 can classify the first side edge and the second side edge using an offboard system containing site design files. The edge type classification can comprise an attribute of the linework in the design. The processing circuitry 230 can collect information from the work machine 100 or from an auxiliary device such as a drone for use in making classification of the first side edge and the second side edge or for other purposes.

The processing circuitry 230 can use the location and type of road edges to generate a path plan for the work machine 100, and for subsequently operating the work machine 100 (e.g., compactor or asphalt compactor) based on the path plan. Example path plans are shown in FIG. 3A and FIG. 3B.

Figures 3A, 3B:
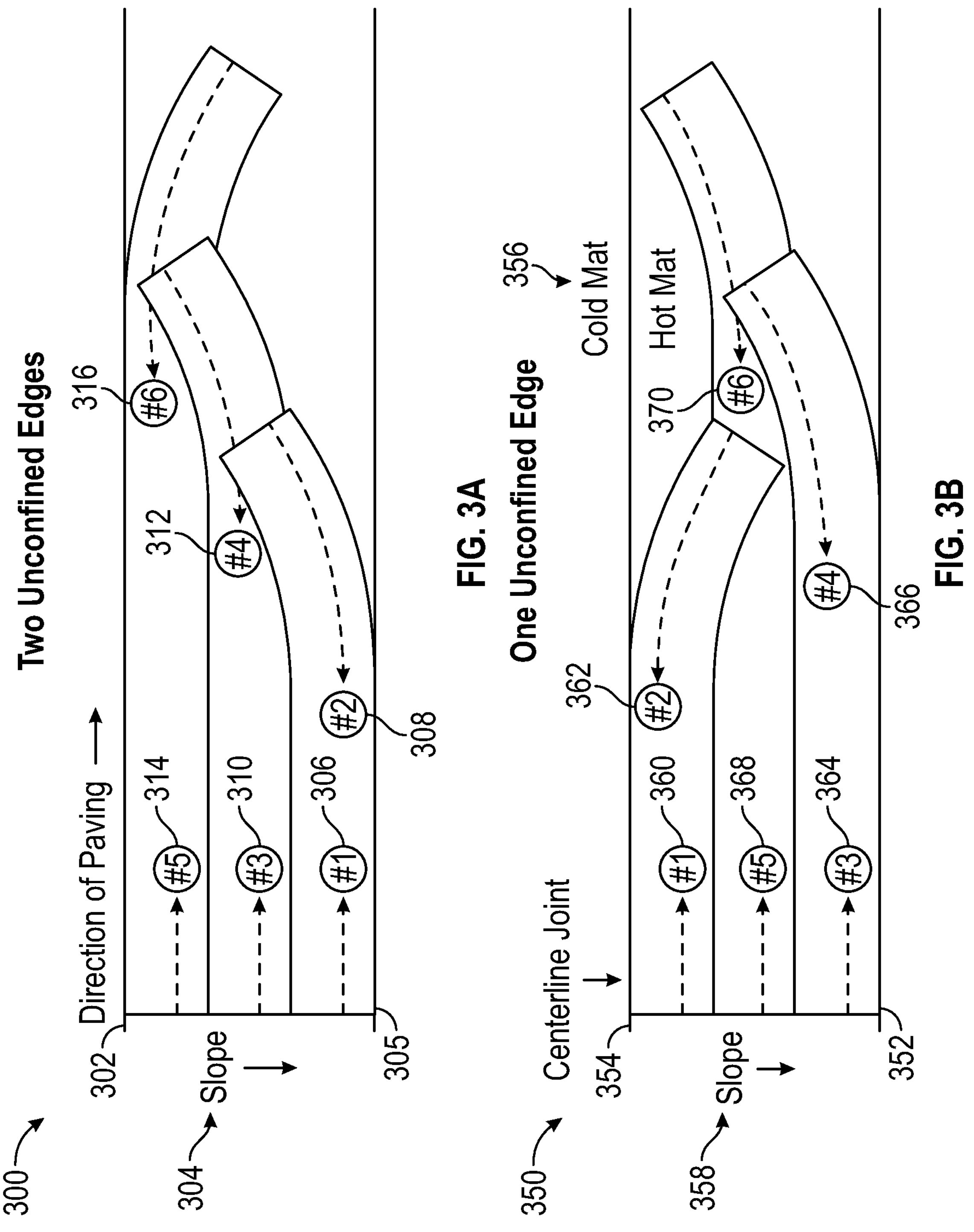
FIG. 3A shows a path plan for a work area having two unconfined edges in accordance with this disclosure.
FIG. 3B shows a path plan for a work area having one unconfined edge and one confined edge in accordance with this disclosure.

FIG. 3A shows a path plan 300 for a work area having two unconfined edges in accordance with this disclosure. In the example, the left edge 302 is the centerline of the structure and there is a slope 304 from the centerline to the right unconfined edge 305. When the structure to be compacted has two unconfined edges and a sloped surface, first passes 306 and 308 can be made along a lower edge of the structure. The next series of passes 310, 312 can be in the center of the mat. The final passes 314, 316 should be along the upper unconfined edge. Compaction from the low side to the high side can build strength in the mat and reduce the amount of mat deformation. A first pass 306 along an unconfined edge should be made with the drum edge away from the edge by a distance, typically on the order of about 5-7 inches, or about 6 inches. The second pass 308 can slightly overlap the unconfined edge to minimize mat distortion. Inspection can be made for cracks in the mat along the drum edge, either through user inspection or automatic inspection using images, and path plans can be adjusted to repair cracks.

FIG. 3B shows a path plan 350 for a work area having one unconfined edge 352 and one confined edge 354 in accordance with this disclosure. In the path plan 350, the left edge of the mat is abutting an adjacent mat 356 along the centerline of the structure. The adjacent mat 356 is compacted and cold. A slope 358 runs from the centerline down to the unconfined edge 352.

More than one rolling pattern or path plan can be used depending on the joint density specification for the work plan. If there is a joint density specification, the first pass 360 can be along the left edge of the mat to take advantage of the highest mat temperature resulting in the highest joint density. During the second pass 362, the drums should be positioned to overlap the hot/cold joint to begin the process of sealing the longitudinal centerline joint. Passes 364 and 366 can be along the unconfined edge 352 to build strength and minimize mat deformation at the unconfined edge 352. Pass 368 and 370 can be made in the center of the mat. This portion of the mat will be coolest by this time, but the center portion of the mat will have, in effect, two confined edges to aid in compaction. If there is no joint density specification, the pass 360 and 362 can be along the right edge on the low side of the sloped mat as shown above in FIG. 3A. The center of the mat is compacted by pass 364 and 366. Finally, the centerline joint is compacted with pass 368 slightly off the joint and pass 370 overlapping the joint. If a curb or other similar edge is present, rolling patterns can be similar near the curb as to an unconfined edge, except that rolling can be kept slightly away from the curb instead of overhanging the edge on pass 370. Further, for multi-lane roads, the process shown in FIG. 3A and FIG. 3B can be repeated based on whether on a previously-paved lane is hot or cold. For example, if a previously-paved lane is cold, the corresponding edge is treated as a constrained/confined edge. Similarly, if a previously-paved lane is warm, the corresponding edge should be treated as an unconfined edge, similarly to what can occur during paving may occur in an “echelon” fashion or method wherein multiple lanes are paved side-by-side with adjacent compactors or paving machines slightly offset.

The work plan illustrated can be uploaded or retrieved from a database of autonomous tasks saved locally or remotely from the work machine 100 or remote control location. The operator of work machine 100 can also select a particular task, review and change parameters/characteristics of the task, command work machine 100 to initiate a task, as well as command work machine 100 to cease a task, as examples. The controller 160 can know the work area from a work site plan input and can know the width of the compactor roller and then divides the work area into the required number of work lanes.

Figure 4:
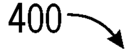
FIG. 4 is a flowchart depicting an example method of operating a work machine in accordance with this disclosure.
Figure 4:
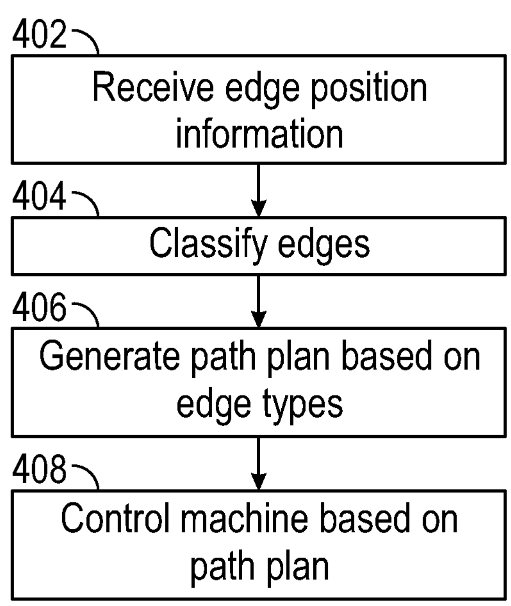

FIG. 4 is a flowchart depicting an example method 400 of operating a work machine 100 in accordance with this disclosure. The method 400 can be performed by elements of FIG. 1 and FIG. 2, including in particular cameras 162, remote control apparatus 101, remote operator station 200, processing circuitry 230, controller 160, etc.

The method 400 can begin with operation 402 with the processing circuitry 230 receiving position information of a first side edge and a second side edge opposite the first side edge of a work area of the compactor. The method 400 can continue with operation 404 with the processing circuitry 230 classifying each of the first side edge and the second side edge as either a confined edge or an un-confined edge.

The method 400 can continue with operation 406 with the processing circuitry 230 generating a path plan for the compactor based on location and classification of the first side edge and the second side edge. The method 400 can continue with the controller 160 controlling the working machine to perform work in the work area based on the based on the path plan. The path plan can be similar to and based on considerations described above regarding mat, joints, etc.

The method 400 can comprise any of the other operations of processing circuitry 230 described above, or of the imaging devices described above. For example, the method 400 can include classifying each of the first side edge and the second side edge according to image processing algorithms on received images.

The method 400 can include determining size, location, dimensions, etc. of a work area within which the work machine 100 will perform predefined or ad hoc autonomous or manual operations. The size, location, dimensions, etc. can be determined by accessing stored location information of the work area, location sensors of the work machine 100, and any other available sensors or systems, including satellite systems, drones, thermal imaging systems, etc.

INDUSTRIAL APPLICABILITY

In general, work machine 100 can be configured and equipped to receive location information for road edges in a compaction work area. After determining the types of the pertinent work edges, a compaction plan can be generated to perform compaction such that hot mat is laid down in the proper location based on slope, confined edges, and other considerations.

While the work machine 100 is executing the work plan, the operator can use remote control apparatus 101 to monitor progress of the task by the machine, or to provide manual input classifying the road edges as either confined or unconfined.

The above detailed description is intended to be illustrative, and not restrictive. The scope of the disclosure should, therefore, be determined with references to the appended claims, along with the full scope of equivalents to which such claims are entitled.

What is claimed is:

1. A compactor comprising:

a cylindrical drum rotatable about a drum axis oriented generally transverse to a direction of travel of the compactor;

an interface configured to receive position information of a first side edge and a second side edge opposite the first side edge of a work area of the compactor; and processing circuitry coupled to the interface and configured to:

receive the position information of the first side edge and the second side edge opposite the first side edge of the work area of the compactor;

classify each of the first side edge and the second side edge as either a confined edge having a supporting structure or an unconfined edge lacking a supporting structure;

generate a path plan for the compactor based on the position information and classification of the first side edge and the second side edge, wherein the path plan includes different compaction patterns for confined edges versus unconfined edges, the different compaction patterns including different positioning of the cylindrical drum relative to the first side edge and the second side edge based on the classification, wherein the path plan defines a series of passes of the cylindrical drum over a mat in the work area, and wherein a first pass of the series of passes is along an unconfined edge with the cylindrical drum offset from the unconfined edge by a distance when both the first side edge and the second side edge are classified as unconfined edges, and the first pass of the series of passes is along a confined edge when only one of the first side edge and the second side edge is classified as an unconfined edge; and operate the compactor based on the path plan.

2. The compactor of claim 1, wherein the interface is coupled to a device remote from the compactor for receiving images of the work area.

3. The compactor of claim 2, wherein to classify the first side edge and the second side edge, the processing circuitry is configured to classify according to image processing algorithms on received images.

4. The compactor of claim 3, wherein the processing circuitry is configured to classify each of the first side edge and the second side edge by image recognition.

5. The compactor of claim 3, wherein the processing circuitry is configured to adapt the path plan based on the received images obtained during operation of the compactor.

6. The compactor of claim 3, wherein the processing circuitry is configured to classify each of the first side edge and the second side edge based on a height or a distance profile of a detected edge.

7. The compactor of claim 6, wherein the processing circuitry specifies a lateral distance from the compactor for edge detection scanning.

8. The compactor of claim 1, wherein to classify the first side edge and the second side edge the processing circuitry is configured to:

provide a command to a user display requesting user classification.

9. The compactor of claim 8, wherein the user display is located on the compactor.

10. The compactor of claim 8, wherein the user display is remote from the compactor.

11. The compactor of claim 1, wherein the compactor comprises an asphalt compactor.

12. The compactor of claim 11, wherein a second pass of the series of passes along the unconfined edge overlaps the unconfined edge.

13. The compactor of claim 11, wherein the processing circuitry is configured to adapt the path plan based on a height of the supporting structure at the confined edge.

14. The compactor of claim 1, wherein a first edge and a second edge are detected, and wherein the first edge and the second edge are not of a same classification.

15. A method of operating a compactor including a cylindrical drum rotatable about a drum axis oriented generally transverse to a direction of travel of the compactor, the method comprising:

receiving position information of a first side edge and a second side edge opposite the first side edge of a work area of the compactor;

classifying each of the first side edge and the second side edge as either a confined edge having a supporting structure or an unconfined edge lacking a supporting structure;

generating a path plan for the compactor based on location and classification of the first side edge and the second side edge, wherein the path plan includes different compaction patterns for confined edges versus unconfined edges, the different compaction patterns including different positioning of the cylindrical drum relative to the first side edge and the second side edge based on the classification, wherein the path plan defines a series of passes of a cylindrical drum over a mat in the work area, and wherein a first pass of the series of passes is along an unconfined edge with the cylindrical drum offset from the unconfined edge by a distance when both the first side edge and the second side edge are classified as unconfined edges, and the first pass of the series of passes is along a confined edge when only one of the first side edge and the second side edge is classified as an unconfined edge; and operating the compactor based on the path plan.

16. The method of claim 15, further comprising classifying each of the first side edge and the second side edge according to image processing algorithms on received images.

17. The method of claim 16, further comprising classifying each of the first side edge and the second side edge based on a height or a distance profile of a detected edge.

18. The method of claim 16, further comprising classifying each of the first side edge and the second side edge using thermal imaging.

19. A system comprising:

an image capturing device configured to capture an image of at least a portion of an environment adjacent to a compactor, the compactor including a cylindrical drum rotatable about a drum axis oriented generally transverse to a direction of travel of the compactor;

a location sensor configured to detect location of the compactor; and processing circuitry configured to:

receive position information of a first side edge and a second side edge opposite the first side edge of a work area of the compactor;

classify each of the first side edge and the second side edge as either a confined edge having a supporting structure or an unconfined edge lacking a supporting structure;

generate a path plan for the compactor based on location and classification of the first side edge and the second side edge, wherein the path plan includes different compaction patterns for the confined edge versus unconfined edge, the different compaction patterns including different positioning of the cylindrical drum relative to the first side edge and the second side edge based on the classification, wherein the path plan defines a series of passes of the cylindrical drum over a mat in the work area, and wherein a first pass of the series of passes is along an unconfined edge with the cylindrical drum offset from the unconfined edge by a distance when both the first side edge and the second side edge are classified as unconfined edges, and the first pass of the series of passes is along a confined edge when only one of the first side edge and the second side edge is classified as an unconfined edge; and operate the compactor based on the path plan.

20. The system of claim 19, further comprising a remote device, and wherein the remote device provides images to a display of the compactor.

21. The system of claim 20, wherein the display is remote from the compactor.

22. The system of claim 19, further comprising thermal imaging circuitry configured to provide thermal images of the work area, and wherein the processing circuitry is configured to classify at least one of the first side edge and the second side edge based on the thermal images.

* * * * *